(12) United States Patent
Roznitsky et al.

(10) Patent No.: US 8,169,099 B2
(45) Date of Patent: May 1, 2012

(54) DEEP OFFSHORE FLOATING WIND TURBINE AND METHOD OF DEEP OFFSHORE FLOATING WIND TURBINE ASSEMBLY, TRANSPORTATION, INSTALLATION AND OPERATION

(76) Inventors: Samuel Roznitsky, Fair Lawn, NJ (US); Moshe Roznitsky, Hillsdale, NJ (US); Yoel Roznitsky, Arlington, MA (US); Hilela Roznitsky, New York, NY (US)

( * ) Notice: Subject to any disclaimer, the term of this patent is extended or adjusted under 35 U.S.C. 154(b) by 0 days.

(21) Appl. No.: 13/002,308

(22) PCT Filed: Aug. 4, 2009

(86) PCT No.: PCT/US2009/004465
§ 371 (c)(1),
(2), (4) Date: Dec. 31, 2010

(87) PCT Pub. No.: WO2010/021655
PCT Pub. Date: Feb. 25, 2010

(65) Prior Publication Data
US 2011/0148115 A1    Jun. 23, 2011

Related U.S. Application Data

(60) Provisional application No. 61/189,237, filed on Aug. 18, 2008, provisional application No. 61/216,682, filed on May 20, 2009, provisional application No. 61/268,383, filed on Jun. 12, 2009.

(51) Int. Cl.
*F03B 13/12* (2006.01)
*F03D 11/04* (2006.01)

(52) U.S. Cl. .................... 290/44; 290/55; 416/85

(58) Field of Classification Search .............. 290/43, 290/44, 54, 55; 416/85, 224 R
See application file for complete search history.

(56) References Cited

U.S. PATENT DOCUMENTS

| | | | | |
|---|---|---|---|---|
| 6,100,600 A * | 8/2000 | Pflanz | ............... | 290/54 |
| 6,294,844 B1 * | 9/2001 | Lagerwey | ............... | 290/55 |
| 7,075,189 B2 * | 7/2006 | Heronemus et al. | ............... | 290/44 |
| 7,156,586 B2 * | 1/2007 | Nim | ............... | 405/223.1 |
| 7,456,515 B2 * | 11/2008 | Nielsen | ............... | 290/55 |
| 7,612,462 B2 * | 11/2009 | Viterna | ............... | 290/53 |
| 8,022,566 B2 * | 9/2011 | Loh et al. | ............... | 290/44 |

FOREIGN PATENT DOCUMENTS

| | | |
|---|---|---|
| JP | 2002-188557 A | 7/2002 |
| WO | 01-34977 A1 | 5/2001 |
| WO | 03-004869 A1 | 1/2003 |
| WO | 2005-021961 A1 | 3/2005 |

* cited by examiner

*Primary Examiner* — Nicholas Ponomarenko
(74) *Attorney, Agent, or Firm* — Anna Vishev, Esq.

(57) ABSTRACT

A deep off-shore floating wind turbine apparatus and methods of manufacturing, operating, maintaining, protecting and conveying the wind turbine apparatus. The wind turbine includes a rotor converting a motion of air into a movement of the rotor, a hub housing equipment that transforms the movement of the rotor into a useful form of energy, and a tower supporting the hub on one end. The wind turbine further includes a base floating substantially at water surface and movable with respect to the underlying solid surface. The tower is connected to the floating base on the second end. The wind turbine also includes a tilting mechanism tilting the wind turbine into a substantially horizontal orientation and bringing it back into an upright position, as well as a rotating mechanism operable to control azimuth orientation of the wind turbine.

51 Claims, 11 Drawing Sheets

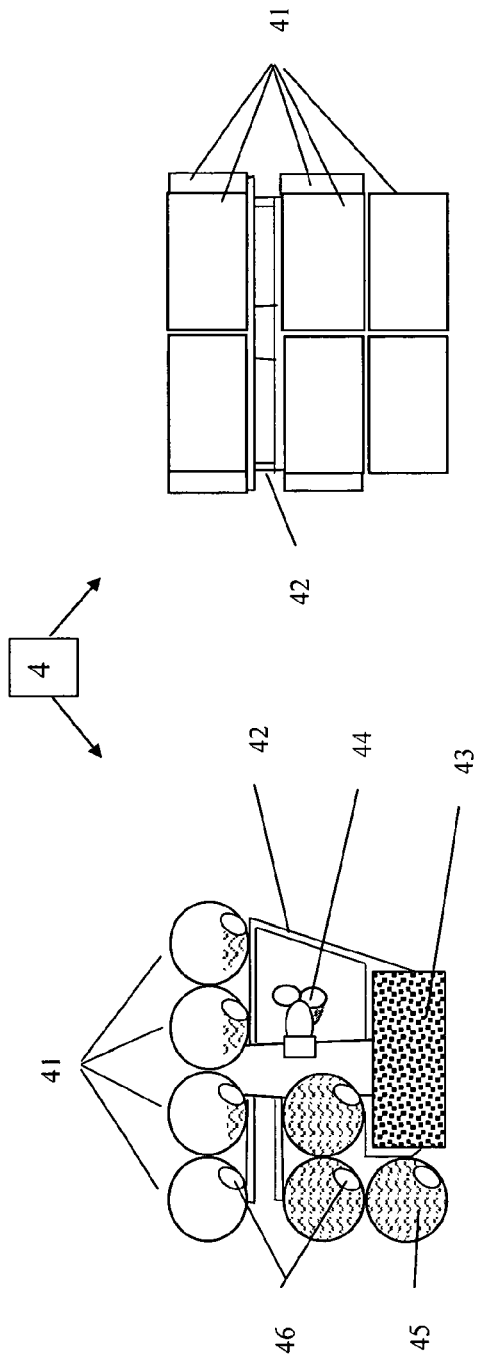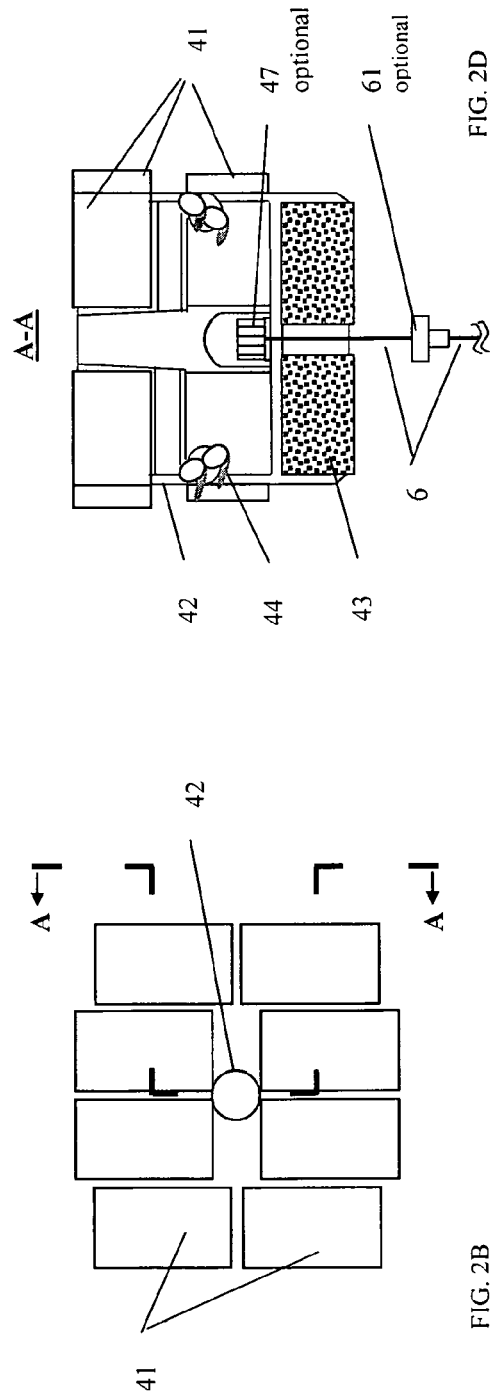

DEEP OFFSHORE FLOATING WIND TURBINE AND METHOD OF DEEP OFFSHORE FLOATING WIND TURBINE ASSEMBLY, TRANSPORTATION, INSTALLATION AND OPERATION

BACKGROUND OF THE INVENTION

The present invention relates to wind-energy harvesting machines (for simplicity called wind generators or wind turbines throughout this document) installed off-shore, in particular at sea, to support structures forming parts of such wind generators, and to methods of manufacturing, transportation, installation, maintenance, and protection in stormy weather of such wind generators.

The technical field of the invention is that of wind generators' structure, manufacturing, transportation, installation, maintenance, and protection of such wind generators for harvesting wind-energy off-shore and converting it into electricity or other useful forms of energy.

The majority of the population in the USA is concentrated along coastal lines representing 78% of the total USA electrical power consumption. When looking at harvesting wind energy resources, current proposed solutions are focused on land-based power generation mainly in the Great Plains, and off-shore shallow-water power generation. Both scenarios polarize proponents and critics alike.

A recently published US DOE report titled "20% Wind Energy by 2030" (DOE Report) provided the majority of background information for this paper. DOE report puts an emphasis on land-based power generation.

The Great Plains offer ample wind, yet they are hundreds and thousands of miles removed from the main demand centers—a condition that makes it impossible to utilize all this free wind without massive upgrades to national electrical grid system at a cost of Billions.

Historically wind turbines have been built mostly for land-based power generation. Commercial size wind turbines have a nameplate capacity of 1 to 5 MW (million watts). They are tall structures as high as 70-120 meters with rotors of 70-100 meters in diameter, and of considerable weight: 250-500 metric tones each. There are three major parts: hub, rotor and tower. The hub is placed on top of the tower and holds the machinery needed to produce electricity: an electric generator, gear transferring rotor movement to the generator, a yaw mechanism rotating the hub on top of the tower toward wind direction, and other parts regulating, monitoring and controlling the operation. Erection of a utility-scale wind turbine is a major undertaking due to the dimensions and weight of the main components which are so large as to require specialized oversized vehicles for transportation to a deployment site and even more extraordinary and huge hoisting equipment. Equally difficult and costly is turbine maintenance that sometimes involves replacement of major components.

Nameplate capacity is only achievable at high wind speed of 12-14 meters/second; at wind speeds below this level, the turbine produces only a fraction of nameplate power. For example: at a speed of 7.0 m/s it generates about 35% of nameplate power (for a 1.6 MW turbine that means that only about 550 kW (thousand watts) are generated, not 1.6 MW), at a speed of 8.5 m/s the fraction is about 60% (the same turbine generating 950 kW). This fraction is called a capacity factor CF. CF is proportional to wind velocity at power of 3; therefore a seemingly small increase in wind speed causes big differences in the power produced. At wind speed of 20-25 m/s a brake is activated stopping the rotor as a measure preventing damage to the turbine—power generation ceases.

Federal agencies have prepared maps depicting the distribution of wind resources for the continental United States and sea areas along the coasts. The maps use wind classification as follows: wind class 1 & 2—average annual speed at 50 in above ground 0-5.6 m/s (considered marginal, not suitable for commercial generation), class 3: 6.4-7.0 m/s at 50 m height, class 4: 7.0-7.5 m/s, class 5: 7.5-8.0 m/s, class 6: 8.0-8.8 m/s, class 7: >8.8 m/s. The USA major land areas suitable for commercial power generation are of class 3 and 4 with 7.0 m/s average annual wind speed. The DOE Report shows that in order to achieve 20% of electrical power from wind by 2030, about 300 GW (billion watts) of nameplate capacity should be installed. The DOE Report assumes that the majority of wind turbines will be built on land where the average wind speeds are 7.0 m/s and the CF=35%. The Report expects CF to grow to 41% by 2030 due to technological improvements; therefore the actual power delivered from wind farms of nameplate 300 GW will be about 125 GW.

Offshore wind is classified as class 6 (the average annual speed at height of 50 m is 8.5 m/s for class 6) and in some areas class 7. Currently at this speed CF equates to 60%, and by 2030 it can be expected to increase to 70% in the same proportion as at lower speeds. Even if CF equates eventually only 65%, the production of 125 GW at sea will require installation of less than 200 GW nameplate capacity—33% reduction when all energy is produced at sea instead of land. The DOE Report gives a figure of 400 GW available offshore wind resource that can be fed into the existing transmission grid. This amount should be sufficient by itself to satisfy the 20% renewable energy goal and more.

Shallow water off-shore power generation does address the need of generating power near demand centers, yet it requires foundations to be built at sea upon which turbines are installed. The difficult nature of turbine erection at sea increases the cost of deployment by about 42% versus land-based variety. Shallow-water turbines also have galvanized communities to reject such installations on a variety of reasons including environmental, ecological, real-estate and tourism.

The prospects of leveraging deep water off-shore wind power generation have been stymied as the cost of such installations proved to be too high and the engineering challenges to secure a wind-farm in deep waters was too daunting. The DOE Report mentions shallow-water offshore wind energy but gives it minor attention, accentuating as disadvantaged the economics for sea-based generation.

The present invention presents a contrary opinion: a structure and method for wind energy harvesting at sea to become a preferred modality economically and technically in a short period of time.

SUMMARY OF THE INVENTION

It is an object of the present invention to facilitate manufacturing on land of a fully assembled deep offshore wind generator. It is another object of the present invention to facilitate transportation of the fully assembled wind generator to the deployment site, in particular a site at sea. Still another object of this invention is to facilitate installation of a wind generator on its useful-energy production site, and in particular a site that is at sea. Still another object of this invention is to facilitate maintenance of a wind generator. Still another object of this invention is to facilitate wind generator's protection in stormy weather. Still another object of this invention is to facilitate minimal ecological impact of such wind generator on the surroundings during its life cycle, including remediation of the production site at the end of the wind generator's useful life.

It is a further object of this invention to propose a support structure and contributing integral features of a wind generator that enable accomplishment of the above underlying objects.

Other features and advantages of the present invention will become apparent from the following description of the invention which refers to the accompanying drawings.

BRIEF DESCRIPTION OF THE DRAWINGS

The invention is illustrated by way of example and not limitation and the figures of the accompanying drawings in which like references denote like or corresponding parts, and in which:

FIG. 2. is a schematic view of the preferred embodiment of a floating base;

DETAILED DESCRIPTION

General Structure of Deep Offshore Floating Wind Generator

The wind turbine for offshore electricity production is proposed for waters deeper than 30-40 meters (up to 30 m depth the waters are considered shallow-offshore, this is where present offshore installations worldwide are concentrated).

Figure 1:
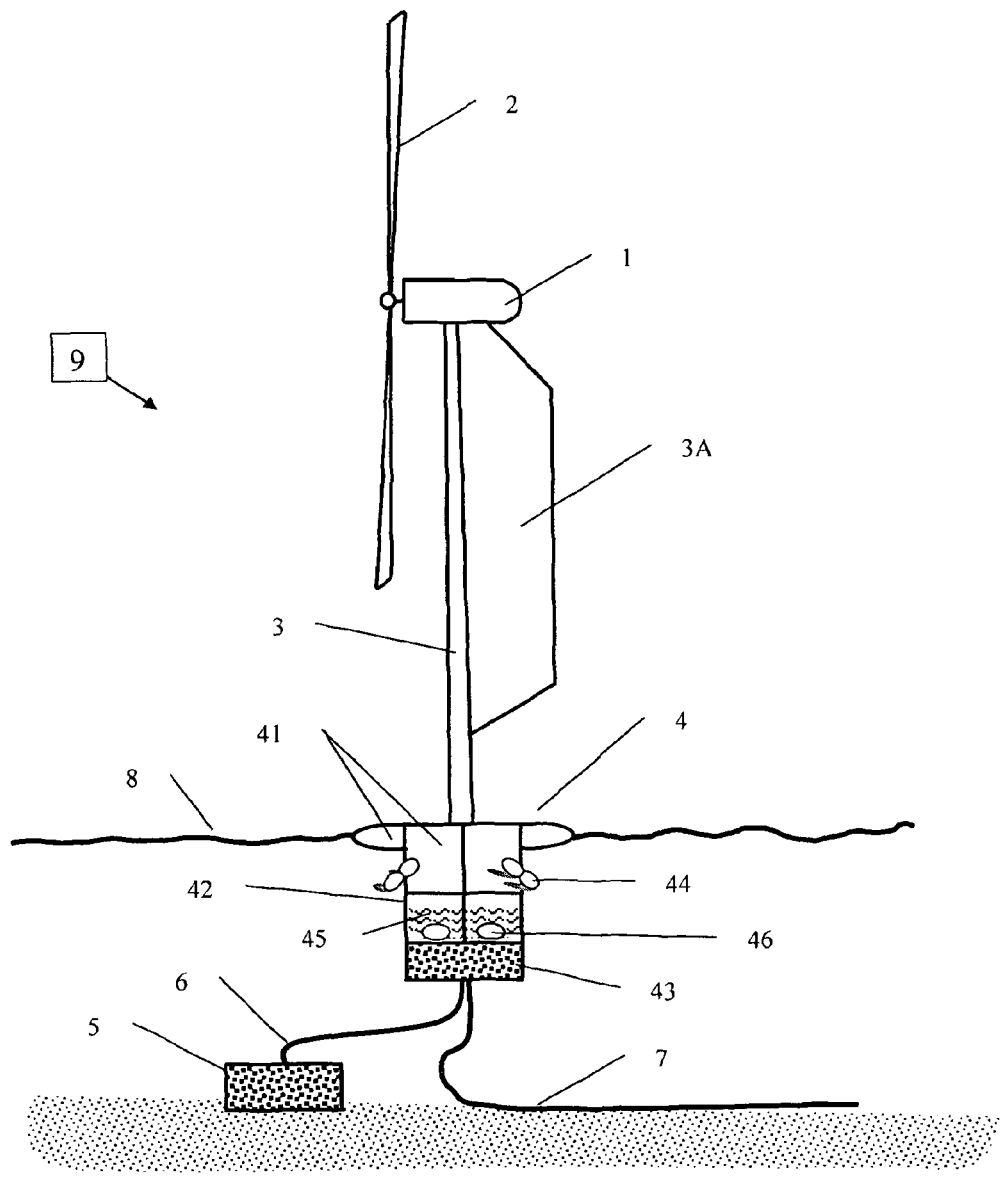
FIG. 1 is a schematic view of the general structure of the deep offshore floating wind turbine in accordance with a preferred embodiment of the present invention.

The turbine 9 is floating in water 8 tethered to the sea floor—refer to FIG. 1. It comprises four main parts: hub 1, rotor 2, tower 3, and floating base 4. The parts, except the rotor 2, are rigidly joined together. The hub 1, the pontoons 41, 45 of the floating base 4 are made watertight. The rotor 2 is water-impervious. The tower 3, or some sections of it, is made preferably watertight, but it is not an unconditional requirement. Yaw angle toward wind direction is controlled by rotating the whole floating structure about its vertical axis utilizing at least 2 motors with propellers 44 or jet streams submerged into water and attached along the circumference of the floating base. An optional sail 3A rigidly fixed along a portion of tower 3 in a plane perpendicular to the plane in which rotor 2 spins, assists with yaw angle toward wind stabilization.

The moorings 5 are made of high-density material of sufficient weight or anchors placed on the sea floor. The preferable loose tethering 6 to moorings 5 has a purpose of prevention of an uncontrollable wind turbine drift at sea. Another possible embodiment entails tension-tethering to the moorings. Whatever tether is employed, the turbine's freedom to rotate around its vertical axis is preserved.

In operational mode the turbine is kept upright by weight of ballast 43, 45 in the base 4, which is assisted by tension-tethering when tension tether is employed. Two types of ballast are used: high-density rock, iron ore, etc. 43, and water. The combination of two types of ballast assures proper wind turbine spatial stability. The water ballast 45 is used to regulate proper submergence and tilt of the structure. With the base fully or nearly fully submerged, waves are washing up against the tower 3 or the top portions of pontoons 41 minimizing the impact of pounding and contributing to the stability of the whole structure at sea. The base 4, the hub 1, and preferably the tower 3 have compartments capable of holding water—analogous to pontoons 45, and are equipped with means 46 to flood and drain the compartments in controlled fashion, thus achieving the proper weight distribution along the structure and controlling the depth and angle of the turbine's incline in water. Frame 42 is a supporting structure upon which all components of the base 4 are fastened, it also provides for tower 3 attachment, tether 6 and feeder 7 couplings and means for tightening of the tether in the case of tension-tethering (47—FIG. 2D). The couplings provide for at least +/−180 degrees azimuth rotational ability of the turbine 9.

The rotor 2 is optimized for operation at higher speed conditions than customary for land-based installations. As a result, a radically different type of rotor might be more advantageous (noise level is of limited importance). The major energy producing components are installed in the hub 1 and/or tower 3 and are similar to those used for land-based operation, however optimized for higher rotational speeds, for example the gear might become a two-stage design instead of conventional 3-stage. Significant change in rotor design will necessitate a corresponding change in the hub and the tower, remaking the tower as a scaffolding-like structure supporting the hub and the rotor. Systems controlling proper submergence, depth, yaw, and incline are also included (91—FIG. 9). Because of the higher capacitance factor, the turbine 9 can be of lower nameplate capacity and still generate relatively high power.

A feeder conduit 7 for transfer of the energy produced in the form of electricity, hydrogen, light/microwave, or other, connects the turbine to a central station where the energy harvested is conditioned to be employed in its most usable form. The most versatile form of energy at present time is electricity, accordingly this conduit is preferably an electrical cable, and the discussion herein focuses on but is not limited to electrical power generation. Deployment of smaller 1.0-1.5 MW (1-1.5 million watts) turbines helps to minimize risk and to facilitate the learning process, but turbines as big as 5.0 MW or bigger can be fashioned as described above. An underwater cable 7 brings the energy from the wind farm to the shore load center, which is at relatively short distance away (15-100 miles). Because of the short distance there is no need for very high-tension lines, 66-110 KV (thousand volts) is most likely to be sufficient. To minimize energy losses in the water and to simplify the synchronization of the wind farm with the on-shore grid, these lines should be direct current (DC). DC-AC conversion on the shore will tie them with the grid.

Many components comprising the wind turbine and discussed herein are not unique, by a way of example: rotor blades 2, power generating components inside the hub 1 and tower 3, tower 3 parts are made by Vestas Wind Systems, GE Energy, Mitsubishi Heavy Industries, and others; pontoons 41 are made by West Metal Works, NY, Imperial Steel Fabricators, IL, ACF Industries, WV, and numerous others. Systems controlling turbine incline and submergence 91 and 46, frame 42, yaw motors 44, tether 6, feeder 7, ballast 5 and 43 are also available from many sources.

Preferred Embodiment of a Floating Base

The floating base 4 in its preferred but not limiting embodiment—refer to FIGS. 2A, 2B, 2C, 2D makes use of 14 pontoons 41, 45, all of the same type. Throughout the text 45 denotes pontoons 41 filled with water. FIGS. 2A, 2B, 2C, 2D show four standard drawing projections of the base 4: the main view, top view, and two orthogonal side views. Each pontoon is equipped with means 46 for transferring water: valves (46A—FIG. 11), pipes, pumps (46B—FIG. 11), sensors (46C—FIG. 11), among pontoons and the environment in determinedly controllable fashion. Eight pontoons are arranged in one cluster, six in another. Pontoons in at least one of the clusters always hold water 45. The pontoons 41 without or with little water serve to provide buoyancy. Frame 42 serves as a backbone to which all components of the base, the tower 3, and the tether 6 are attached. Therefore the base and other structures coupled to the base are to withstand sea motion and wave action, and to be designed according to standard ocean engineering principles. At least two yaw-control motors 44 positioned on the opposite ends of the base are creating a rotating torque capable of accurately following yaw direction command from on-board computers and sensors (91—FIG. 9, FIG. 11). High-density ballast 43 together with empty or partially empty pontoons 41 provides stability to the turbine in water. Submersed in water, the pontoons are subjected to high pressure, and are built to withstand that pressure. An optional tether tensioning winch 47 also known as capstan that is equipped with a submersible motor provides the means for pulling on the tether 6 with sufficient force assisting in proper base 4 submergence. An opening in ballast 43 provides a pass way for the tether 6. An optional coupling 61 allows for at least +/−180 degrees of rotational freedom without causing an appreciable amount of twisting in the tether.

Preferred Embodiment of Utility Scale Wind Generator

Figure 3:
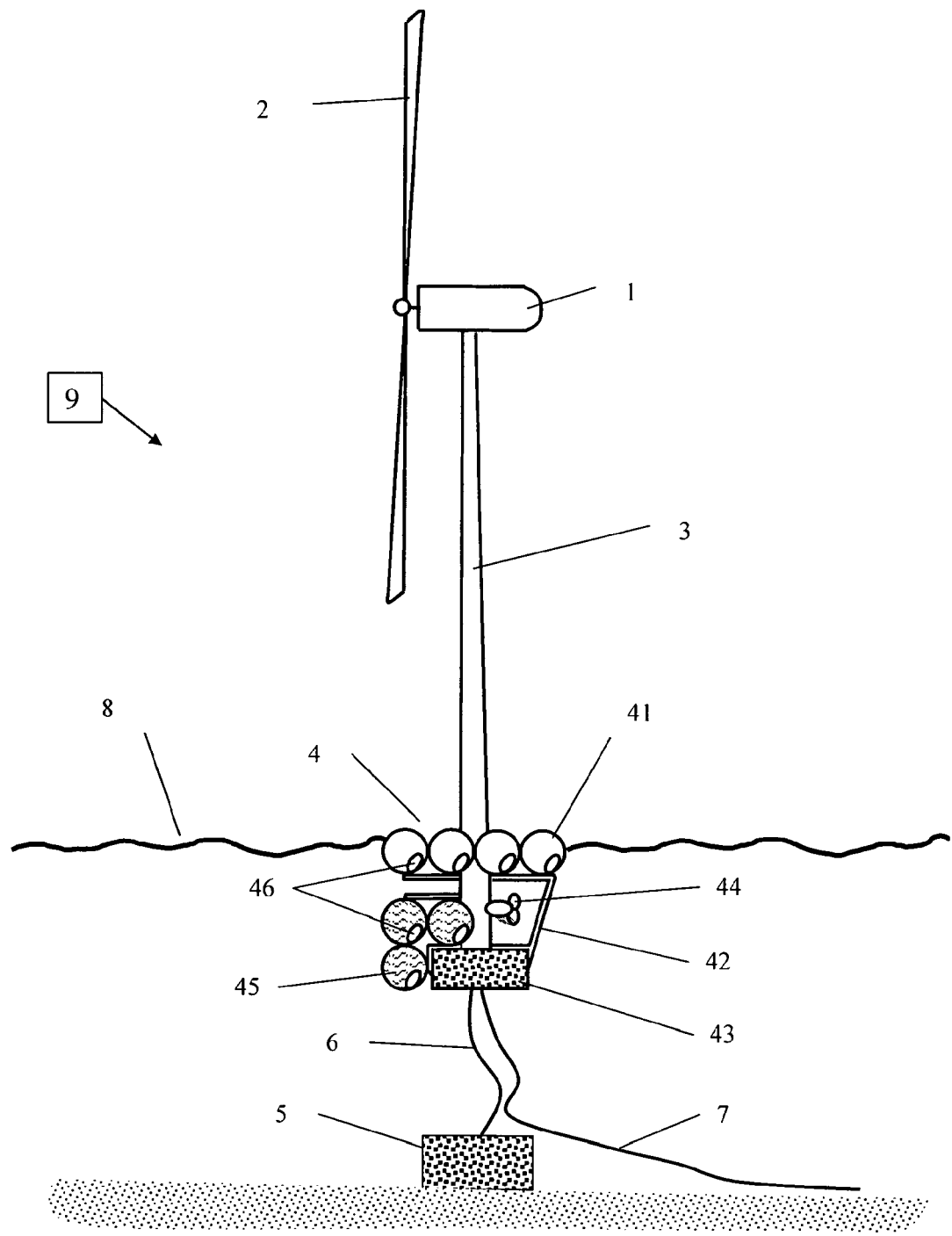
FIG. 3. is a schematic view of the preferred embodiment of the utility scale wind turbine.

An example of preferred embodiment for a wind generator with about 1.5 MW (1.5 million watts) generating capacity is shown in FIG. 3. Weight and dimensions of main parts are assumed to be as follows.

The hub 1 of cylindrical shape with all components installed weighs 75 T (75 metric tons), its dimensions are 13 m (13 meters) in length and 4 m diameter. When fully submerged in water, the hub's displacement equals 163 m$^3$ or 163 T. The rotor 2 weighs 35 T, its displacement is negligibly small. Hub and rotor fully submerged have residual buoyancy of 53 T (163-75-35=53).

The tower 3 has a length of 60 m as measured from the top of the floating base 4 to rotor's 2 shaft and weighs 150 T.

The floating base 4 employs 14 pontoons 41 in two clusters of 8 and 6. Each pontoon is of cylindrical shape with dimensions 9 m in length and 6 m diameter, it weighs about 20 T and fully submerged has a displacement of 250 m$^3$ or 250 T. Each pontoon has means for water fill and emptying 46. The cluster of 8 empty pontoons 41 on the top of the base 4 has overall dimensions 24 m*22 m*6 m and displacement of 2000 T. This cluster therefore creates 2000 T of buoyancy thrust.

Another cluster of 6 pontoons 45 is filled with water; as such it contributes to the overall weight of the structure, but does not provide buoyancy. If emptied this cluster were to provide 1500 T of buoyancy.

Rock ballast 43 with overall dimensions 18 m*12 m*6 m weighs 2300 T and has displacement of 1000 m$^3$, its net gravity in water is 1300 T (2300-1000=1300). It is positioned slightly off-center with respect to turbine (tower's) central line so as to preserve overall gravity center's position on the central line and compensate for offsets of other components.

All components are tied to a frame 42. Frame's weight is 70 T. Two yaw-controlling motors 44 are set on opposite sides of the frame.

The overall height of the floating base 4 from tops of pontoons 41 to the bottom of ballast 43 is 22 m. The overall weight of the whole turbine structure 9 without ballasts is 610 T. When placed in water 8 and with ballasts as shown in FIG. 3, the overall weight is 1910 T, while buoyancy thrust is 2000 T, creating a residual buoyancy of 90 T. It is sufficient for keeping the turbine afloat with only pontoons' tops above the water line 8. When the turbine 9 is tension-tethered, the tether is subject to the force of the residual buoyancy.

Stability of the Wind Generator

Figure 4:
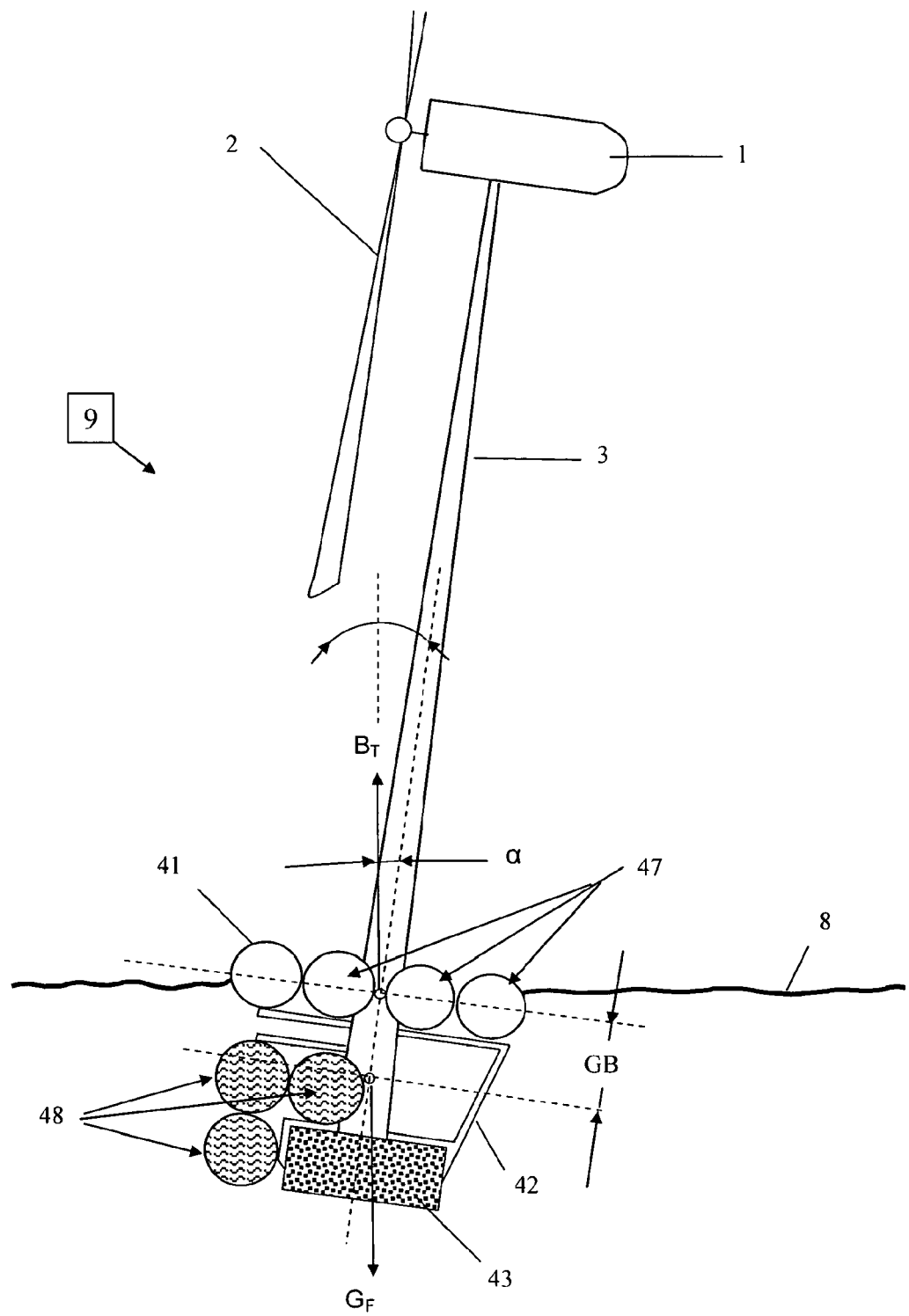
FIG. 4. is a schematic view of stabilizing the wind turbine.

Refer to FIG. 4—the case of a freely floating turbine. The turbine 9 is shown in vertical/operating position. The lower cluster of 6 pontoons is filled with water ballast 48, while the top cluster of 8 pontoons 41 remains unfilled. Two major forces are acting upon the structure in calm water 8: Buoyancy trust $B_T$ and Gravity force $G_F$. Equilibrium of these forces defines structure's vertical position and stability in water.

Calculations made, that are based on numerical values provided in the previous paragraph describing turbine example of preferred embodiment, determine gravity center's position as 10.16 m above the lowest end of the turbine 9 along central line. In FIG. 4 it is shown as a point from where vector $G_F$ originates.

It is assumed that turbine overall central line coincides with tower's central line.

Buoyancy is created by a cluster of 8 pontoons 41 which are symmetrically positioned with respect to turbine central line—see FIG. 4. Buoyancy center is at the intersection of turbine central line and the central plane of the cluster, it is shown as point of origin of vector $B_T$.

The distance GB between gravity center and buoyancy center is equal. 8.8 m, the buoyancy center is above the gravity center. With turbine central line being perfectly upright, the two forces $G_F$ and $B_T$ act along the same line equalizing each other $G_F=B_T$, and the turbine is perfectly stable. If due to wave or wind action the turbine is tilted, then the two forces are not longer aligned, as a result creating a Righting Torque, which is proportional to (GB*sin α), where α is the incline angle between turbine central line and a vertical line. It is clear therefore that the force righting the turbine 9 is proportional to the magnitude of turbine's incline and works to minimize it. The turbine is self-stabilizing about its vertical position.

Initiating Transition of the Wind Generator from Vertical/Operating Position to Horizontal Position Transfer of the turbine 9 into inclined, even horizontal position, is useful for purposes of turbine transportation and storm protection that will be described later.

Figure 5:
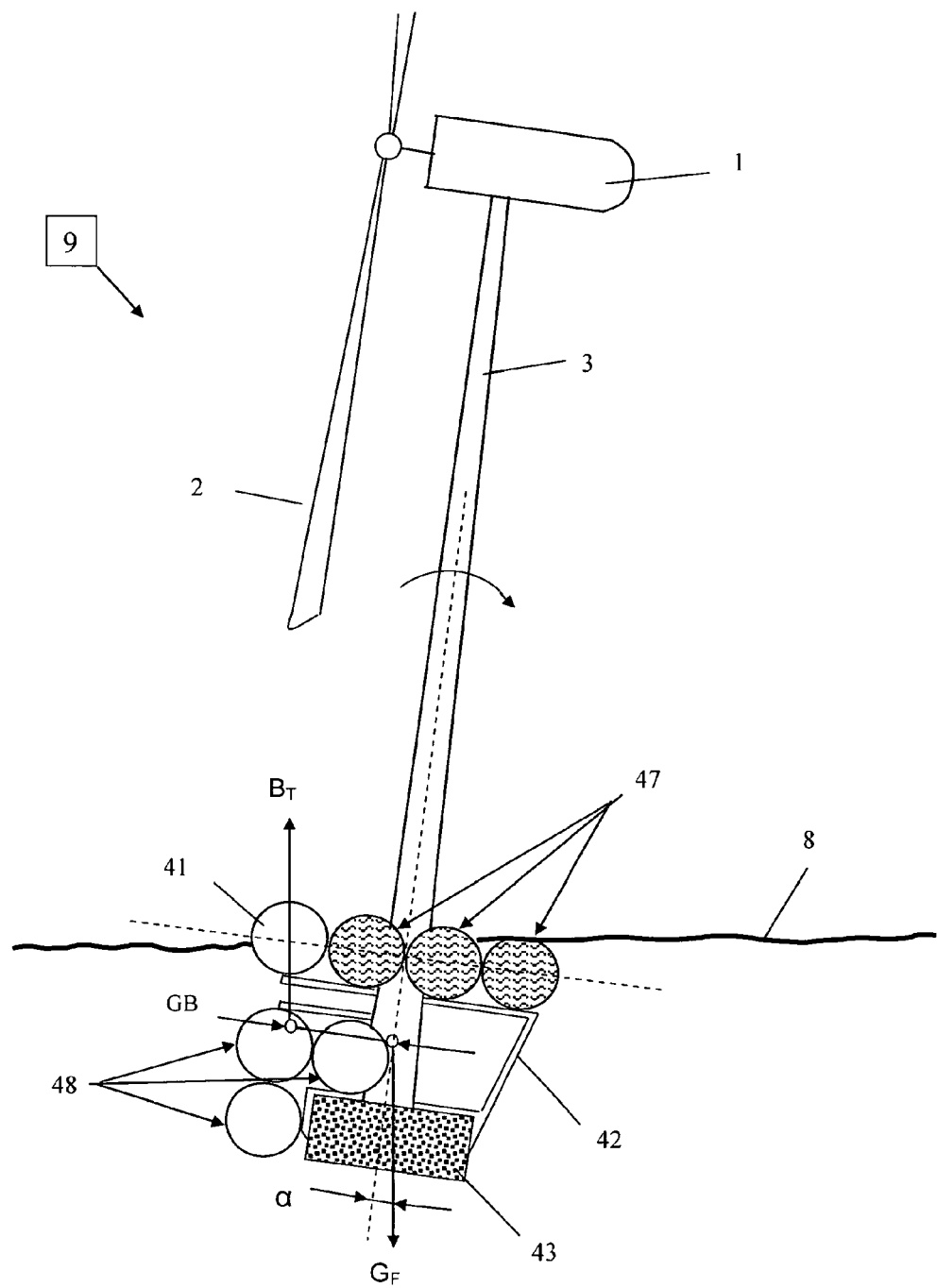
FIG. 5. is a schematic view of initiating transition of the wind turbine from vertical operating position to horizontal position.

The following refers to FIG. 5 and uses as a basis for discussion the preferred embodiment as shown in FIG. 3 and stability analysis shown in FIG. 4, all described in preceding paragraphs.

FIG. 5 depicts the situation wherein water ballast from 6 tanks 48 in the lower pontoon cluster is being transferred to 6 tanks 47 in the top pontoon cluster, thereby initiating transition from vertical position to an increasingly inclined, eventually horizontal position. For simplicity of discussion we assume that the water is transferred from tanks 48 to 47 at once.

Fill of tanks 47 with water while simultaneously emptying of 48 does not change the overall buoyancy of the turbine 9, however it significantly alters the buoyancy center's position within the structure. Calculations of a new buoyancy center provide the following position: 10 m from turbine's bottom and 7.5 m from central line in the frontal plane of the drawing—FIG. 5. The gravity center and value of gravity force do not change. Thus the buoyancy center is now located at about the same lateral line as the gravity center instead of being above the gravity center, as it has been during operational (vertical) position—FIG. 4. The distance between the gravity center and the buoyancy center GB equals now 7.5 m. Gravity and buoyancy forces are no longer aligned, thus creating a Tilting Torque which is proportional to (GB*cos $\alpha$) and is acting to topple the turbine. The angle $\alpha$ as before denotes the angle between the turbine's central line and a vertical line.

It is obvious that water transfer from tanks 48 to tanks 47 does not happen at once, therefore the turbine does not experience a striking blunt force trying to topple it. The amount of water fill is adjusted gradually allowing for smooth transition from vertical to inclined position. Theoretically, when the turbine central line becomes horizontal, the forces of gravity and buoyancy become aligned, and the turbine 9 assumes its new stable position. In practice, the tower and hub become immersed in water thus affecting the turbine eventual inclined position.

The tilting mechanism described is governed by a computer routine defining the proper vertical-to-incline maneuver that is stored in on-board computer/controller (91—FIG. 9) and is activated on a command sent from an on-shore command-and-control center. After receiving the command the process is initiated and runs automatically controlled and monitored by the controller 91.

Initiating Transition of the Wind Generator from Horizontal Position to Vertical/Operating Position The tilting mechanism as described above, but running in reverse transfers the turbine from horizontal to vertical position and is useful for the purpose of resumption or commencement of turbine normal operation after turbine transportation to the deployment site or storm protection measures (this will be described later). The following refers to FIG. 6 and uses as a basis for discussion the preferred embodiment as shown in FIG. 3, and analyses shown in FIGS. 4 and 5, all described in preceding paragraphs.

Turbine 9 is kept in an inclined position by proper relation between gravity and buoyancy forces affecting the structure, as shown in FIG. 5. While in inclined position, the transfer of water from tanks 47 to tanks 48 is having an opposite effect—it brings the turbine upright. For simplicity we assume the water transfer happens at once, as shown in FIG. 6.

Figure 6:
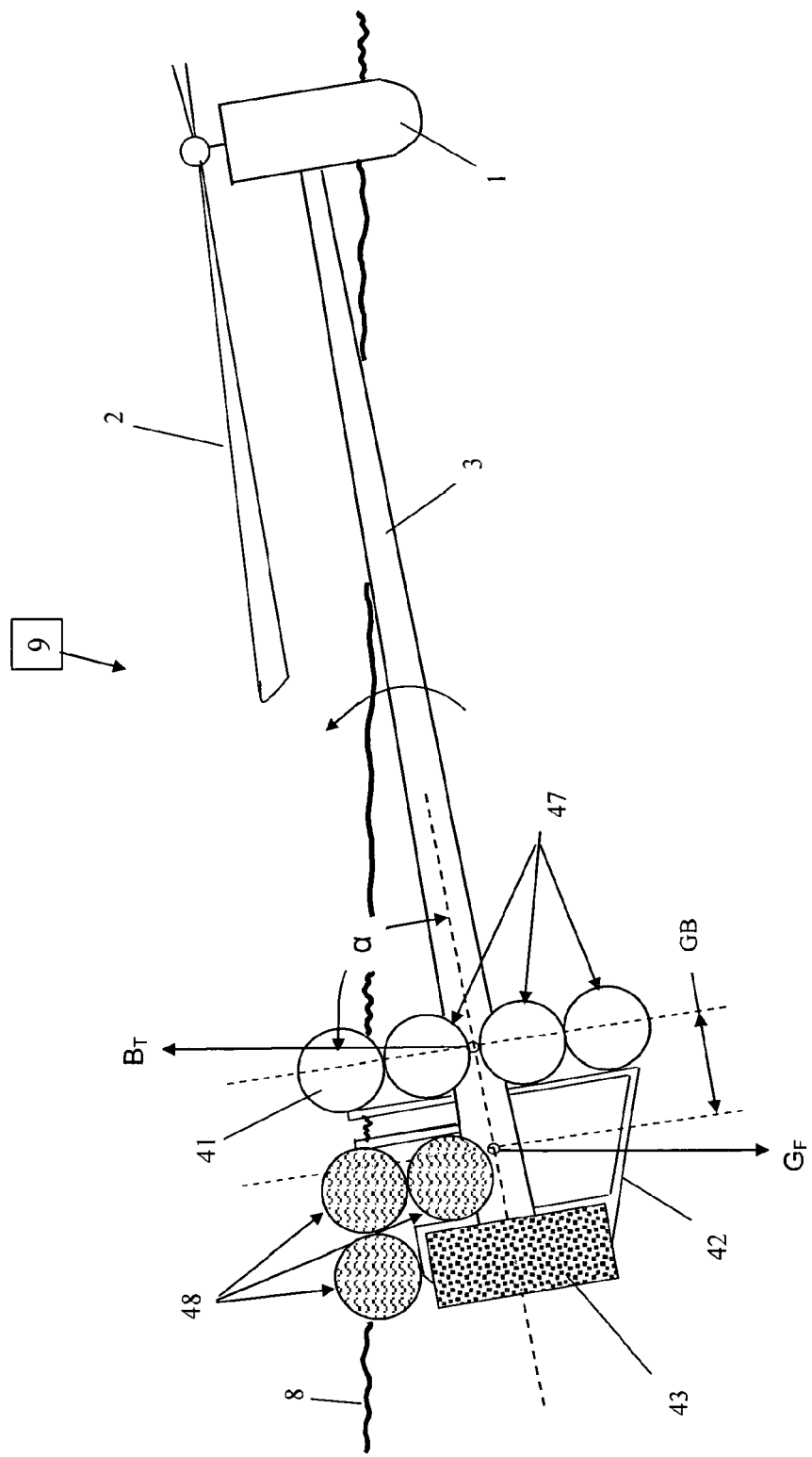
FIG. 6. is a schematic view of initiating transition of the wind turbine from horizontal position to vertical operating position.

Emptying tanks 47 and water-filling tanks 48 transfers the buoyancy center to a location on turbine central line as shown in FIG. 6. Overall buoyancy thrust amount does not change. The gravity center and gravity force are not affected. The distance between the gravity and buoyancy centers GB becomes equal 8.8 m along the turbine central line—see discussion accompanying FIG. 4. Righting Torque which is proportional to (GB*sin $\alpha$) is created as a result. The angle $\alpha$ is an angle between turbine central line and a vertical line. The torque affecting the turbine drops to zero when the gravity and buoyancy forces align together; it happens when turbine stands perfectly upright. This is turbine's new stable position in which the turbine 9 starts normal operation.

The water transfer between tanks 47 and 48 occurs gradually. Controlling the amount and rate of water transfer regulates the force affecting the turbine position in terms of the rate of change and the angle of incline. The routine that controls the proper incline-to-vertical maneuver is stored in on-board controller (91—FIG. 9), and is activated on a command sent from an on-shore command-and-control center. After receiving the command, the process is initiated and runs automatically controlled and monitored by the controller 91.

Command-and-Control System

Figure 11:
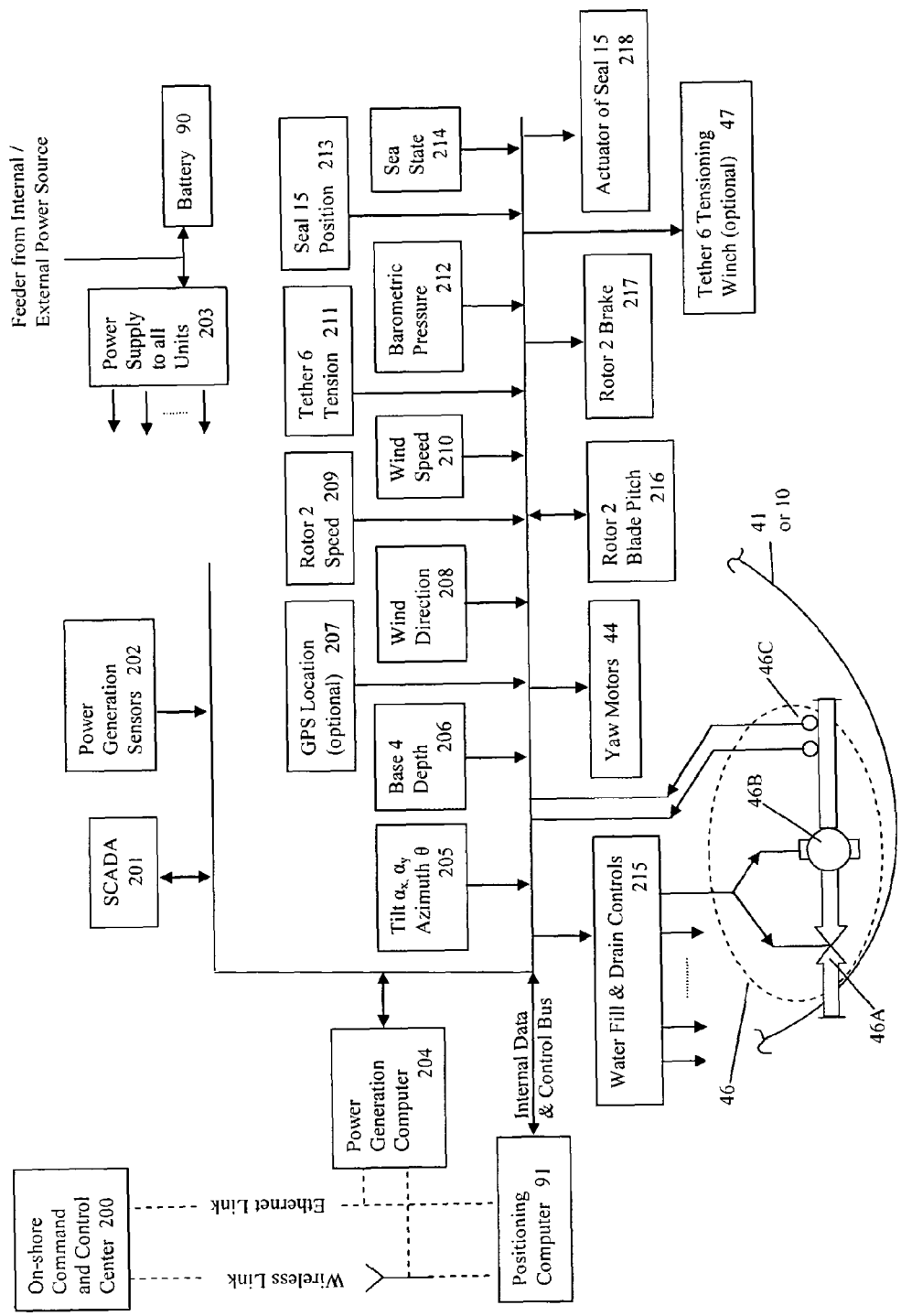
FIG. 11 is a schematic view of the command-and-control system.

The preferred but not limited embodiment of wind generator Command-and-Control System is depicted in FIG. 11. On-shore Command-and-Control Center 200 is linked to wind generator's on-board system with at least one but preferably two communication links: Ethernet and a Wireless link. Two on-board computers (204 and 91) control and monitor all operations executed by the wind generator. Power Generation Computer 204 is primarily responsible for optimal power generation functionality through Supervisory Control and Data Acquisition (SCADA) 201, utilizing a multitude of power metering sensors 202, positioning sensors and actuators. Positioning Computer 91 is primarily responsible for all functions related to stability and performance of the wind generator while in transportation, in operation, submergence, transition from vertical to horizontal position and vise-versa. An internal Data and Control Bus connects the computers with one another and to on-board sensors and actuators. Powering of the computers and all on-board monitoring and executing devices is provided by internally produced energy through operational wind energy generation, from an external (on-shore or on-ship) source when the wind generator is not operational, or from internal battery 90 storage when both normal internal generation and external feed are not available.

Positioning Computer 91 receives input from many sensors that provide:

wind turbine spatial orientation—Tilt and Azimuth sensors 205 provide turbine's central line incline angles in two vertical orthogonal planes, as well as magnetic azimuth and rotor 2 position in reference to Wind Direction 208, Depth sensor 206 measures depth of turbine base 4 submergence, also available are GPS coordinates 207 (optional);

operational data—Blade Pitch angle 216 of rotor 2, rotational Speed 209 of rotor 2, Tension 211 of tether 6, Position 213 of seal 15, Water pressure, temperature and amount of fill 46C in pontoons 41, enclosure 10, and tower 3 compartments (optional);

wind data—Wind Direction 208, Wind Speed 210, Barometric Pressure 212;

State of the sea 214—wave height, wave period, wave direction, water temperature.

All sensory data is periodically polled and relayed to the Command and Control Center 200 as per SCADA 201 established protocol.

The sensory data and proper commands received from Command and Control Center 200 activate specific computer routines embedded in Computer 91 memory. These routines control the devices and actuators that define turbine performance: Yaw Motors 44 keep the turbine orientation toward the wind, Blade Pitch angle 216 of rotor 2 blades control rotor speed, Water Fill and Drain 215 control amount of water ballast in each pontoon 41, compartment 10 and in tower 3 (optional), hence determining turbine tilt angle and tilt direction and so establish whether the turbine is in its vertical operational position or is transitioned to horizontal position for transportation or to full submergence for protection against forecasted hurricane.

Means for water fill and drainage 46 include gate valve 46A, pump 46B, inlet and outlet pipes, sensors 46C; they are present in each pontoon and in other water-ballast-filed compartments.

As part of preparation for transfer to horizontal position, the Computer 91 commands stop to rotor 2 rotations; this is executed by adjusting Blade Pitch 216 and applying Brake 217. Actuation 218 of seal 15 protects power generating and the Command and Control System equipment (90, 91, 201-205, etc.) installed in hub 1 from probable water damage.

In a case when tension-tethering is employed, a Winch 47 (optional) performs the tensioning action and assists in turbine proper submergence.

Computer 91 is equipped with a proper routine for every type of turbine function: normal operation—in coordination with Power Generation Computer 204, transportation from/to dry dock, protection in severe weather, and all transitions from one procedure to another.

The sensory input, the computer-based actuation and functions execution equip the turbine with stand-alone autonomous capabilities for operating, taking evasive protective action and initiating maintenance requests. In preferred embodiment however, the said main functions are expected to be initiated on a command received from Command and Control Center 200. The Center 200 also has the capability to upgrade and otherwise change the routines embedded in computer 91 with newer versions, utilizing for this purpose the communication links connecting the center to the turbine.

Figure 7:
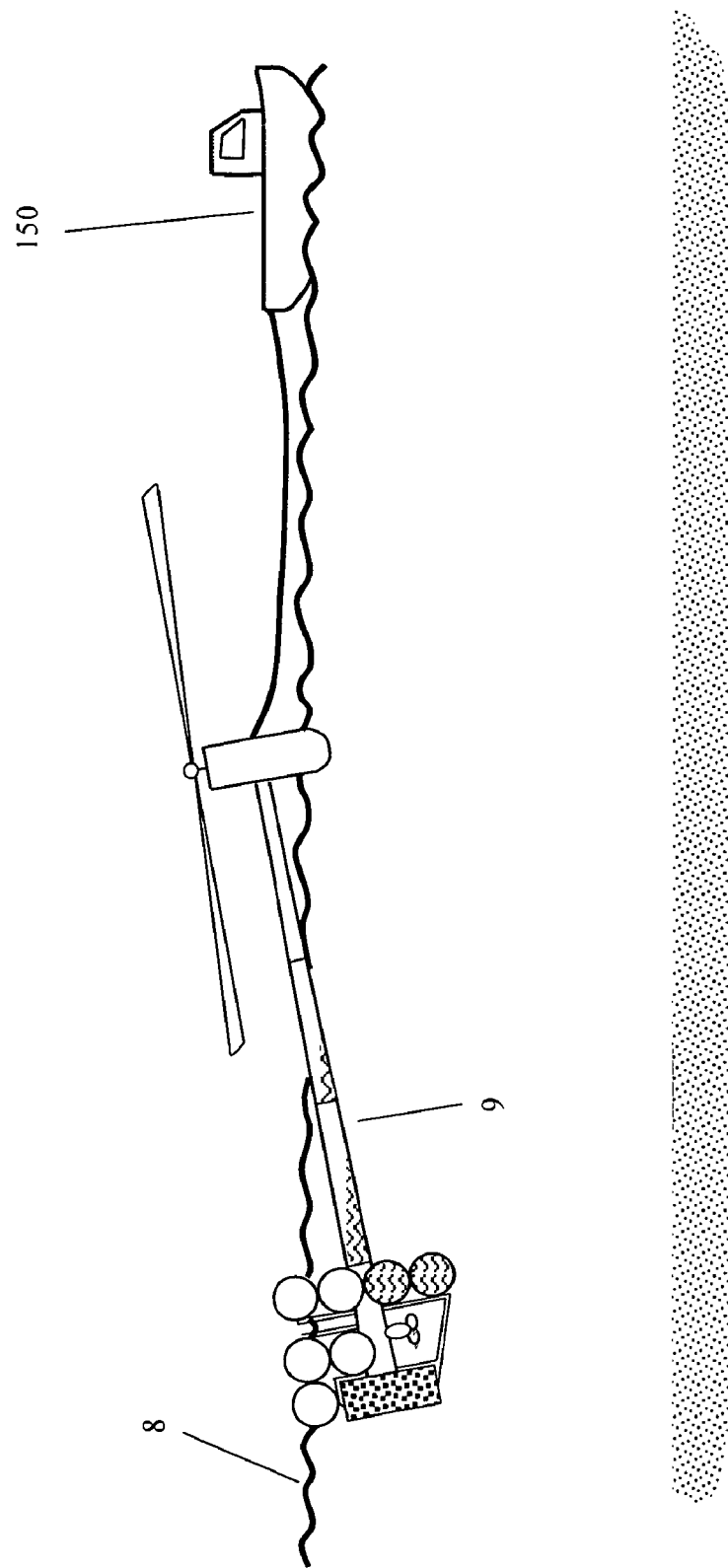
FIG. 7. is a schematic view of towing the wind turbine for deployment at sea or for dry dock maintenance.

Towing of the Wind Generator for Deployment at Sea or for Onshore/Dry Dock Maintenance A wind generator 9 for sea deployment that is manufactured in a dry dock on-shore does not necessitate transportation along highways. This crucial characteristic makes its manufacturing, and installation at sea, completely different from the land-based variety. FIG. 7 shows the method. The turbine is assembled in a dry dock similar to that used for shipbuilding, which exist in many coastal states. The fully assembled turbine 9 is floated in water 8 and towed in a reclined position utilizing a tow boat 150 or boats to the deployment locale, which is at a relatively short distance from the shore. Towing in the reclined position assures exceptional stability and allows for unproblematic clearing of bridges and other overhead obstacles (example—transmission lines). Sections in base 4, the hub 1, and preferably the tower 3, are filled with water and equipped with means 46 for controlled fill and drainage of water: valves, pumps, pipes, sensors, etc.—refer to discussion of FIG. 1, which allows for proper weight distribution and submergence along the structure during transportation. The water fill and drainage is controlled and monitored by the turbine's on-board computer (91—FIG. 9) in preparation for and prior to towing.

Controlled transfer of water ballast in base 4 as described in discussion accompanying FIG. 6 and emptying water from the hub and tower sections brings the turbine to the upright position.

After tethering to moorings that have been placed on the sea floor, and attaching an underwater feeder cable, the turbine is ready to start operation. No more difficult, dangerous, time consuming and expensive assembly on-site involving exceptionally bulky, costly and scarcely available machinery. The coupling of the tether 6 and feeder 7 is engaged manually, but fully automatic coupling is not precluded. Tension tethering entails tightening of the tether 6 after attachment. The coupling (61) provides for at least +/−180 degrees azimuth rotational ability of the turbine 9 when in vertical/operational position.

Minor maintenance that requires human involvement most often entails the technician(s) arriving by a small boat, climbing the tower and performing the operation. But due to the ease of transportation and transfer between upright and reclined positions—see discussions of FIGS. 5-6, more extensive repairs and upgrades to the turbine 9 are preferably done on-shore in a dry dock. This approach assures quality maintenance in timely and much less expensive manner than is the current norm.

In preparation for transportation, the tether 6 and feeder 7 should be released. A coupling (not shown) is released manually, but a fully automatic release is not precluded. A tension-tether is loosened prior to release of the coupling.

Severe Weather Protection

Figure 8:
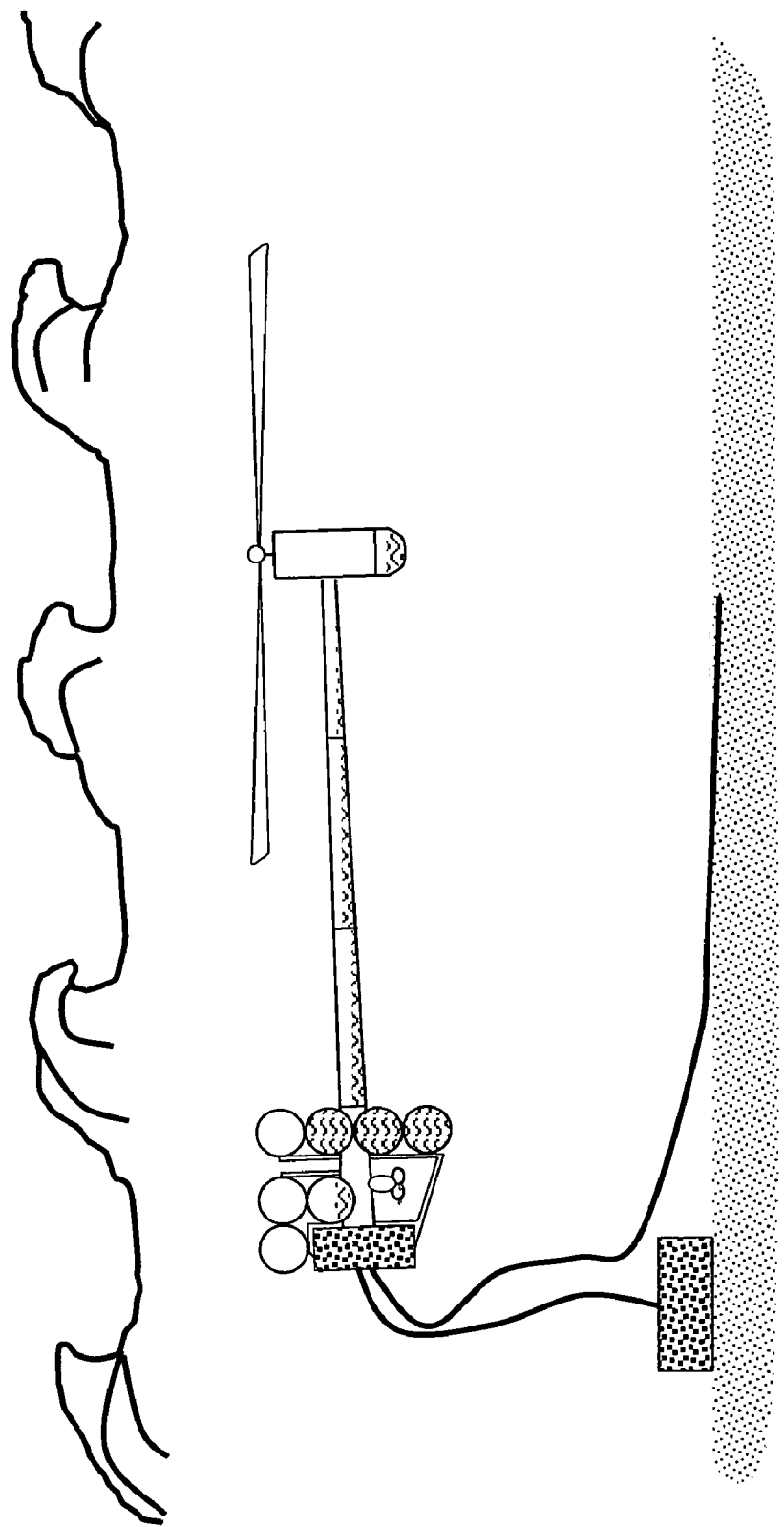
FIG. 8. is a schematic view of protecting the wind turbine during severe weather.

Currently deployed shallow-water offshore installations are lacking protection when exposed to hurricane-force winds. The present invention by design is equipped to withstand stormy weather. FIG. 8 illustrates this approach. Controlled flooding of compartments within the base 4, the hub 1, and preferably the tower 3 allows the turbine 9 to move into a reclined position and fully submerge under the water surface 8, thus offering excellent protection from the damaging wind and waves. The submergence parameters: depths, incline, wave action, are monitored and controlled from an on-board computer (91—FIG. 9). The process of incline is described in the discussion accompanying FIG. 5.

After the storm an action of controlled emptying and redistribution of the ballast water brings the turbine into upright position ready to resume operation. This process is described in the discussion accompanying FIG. 6. The operations of submergence and emergence are initiated remotely from a command-and-control center on-shore, are monitored and guided through by an on-board computer (91—FIG. 9), and utilize power supplied from the shore through the same cable that in normal conditions brings power in opposite direction, from the turbine to the shore. In emergency situation when power on-shore is not available, on-board storage (90—FIG. 9) supplies the necessary power.

Watertight Sealing of Wind Generator's Main Driving Shaft

Figure 9:
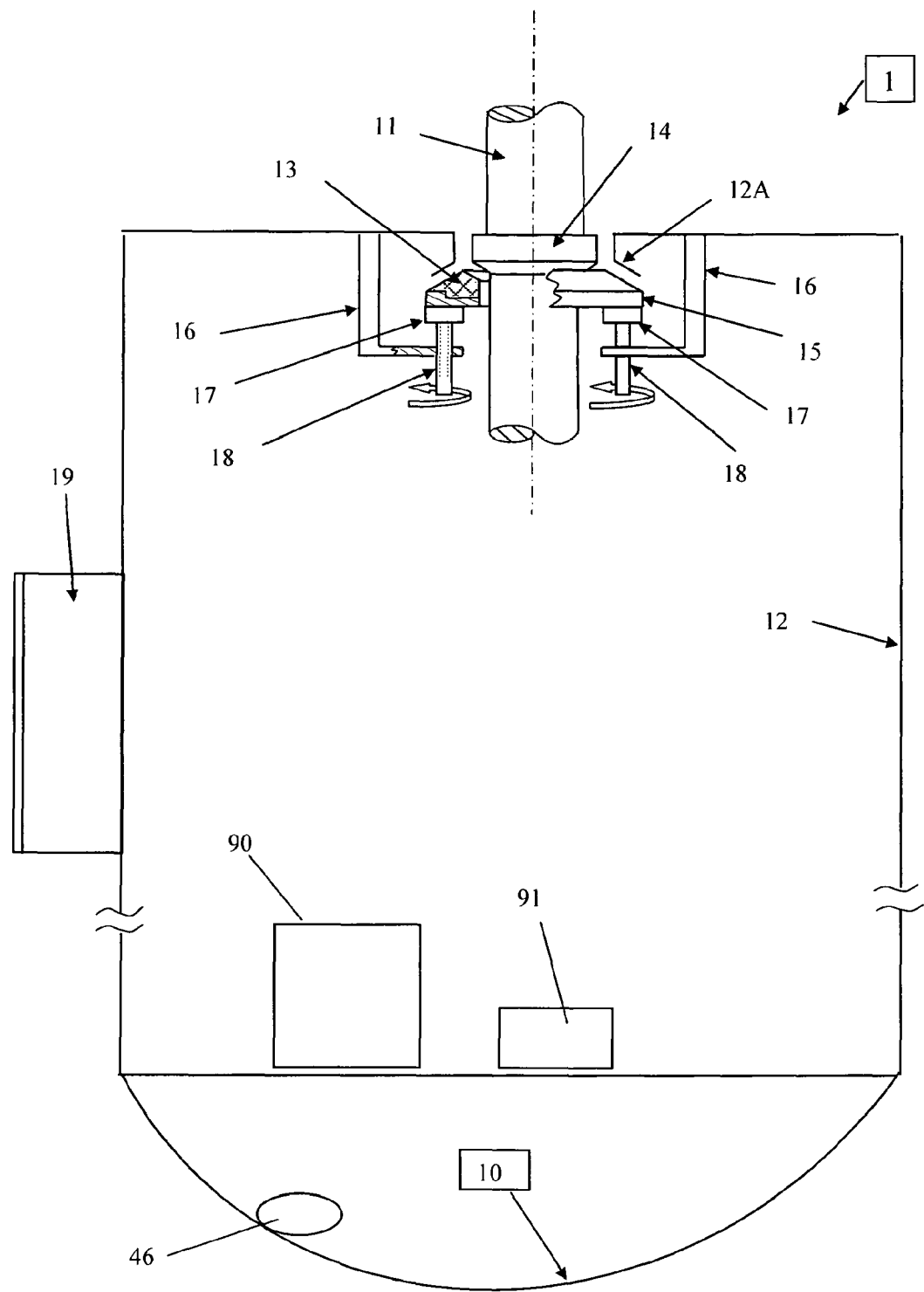
FIG. 9. is a schematic view of watertight sealing of wind turbine's main driving shaft.

Preferred but not limiting embodiment of a watertight hub 1 construction is shown in FIG. 9. The hub comprises two main sections: an enclosure 12 and water ballast section 10. The purpose of the enclosure 12 is to house and protect turbine's power generating machinery installed in the hub 1: main gear, generator, brake, and auxiliary equipment (transformers, controllers, sensors, cooling pumps, etc.)—all not shown. The section 10 is equipped with means for controlled fill and drainage of water 46 for the purpose of holding and regulating water ballast when the turbine is in an inclined position, in particular when submerged underwater for weather protection. The section 10 is completely separated from section 12 by a water impenetrable wall. As essential measure of equipment protection from water damage, the section 12's interior is kept dry in all times. The hub is connected to tower 3 by a flange 19. Inside flange 19, there is a water-tight lock (not shown) for access to the hub by technicians.

Main shaft 11 transfers rotational movement from rotor 2 external to the enclosure 12 to the gear inside. The main shaft's 11 penetration of the hub is the place where water can get into the equipment compartment 12, especially when the hub is under water. FIG. 9 shows the means to prevent this. The shaft has a collar 14 which is conical in shape inwards of the compartment 12. The opening in compartment 12 which the shaft 11 extends through has a flange 12A that is conical in shape and concentric with the shaft, creating a gap with the shaft's collar 14 that is fairly unvarying along its circumference. In cross-section the gap's portion inwards of the compartment 12 is gradually widening along straight lines. A circular seal 15 has a circular concentric opening and is penetrated by the shaft 11 that is concentric with it as well. The seal 15 is equipped with an insert 13 of rubber-like elastic material that has a triangular cross-section shape with apex pointing toward the gap. The seal 15 moves linearly along the shaft by means of at least 2 but preferably 3 or more screws 18 and brackets 16 fastened to a side of the compartment 12 and providing support for the screws. Bushings 17 attached to the seal provide rotary coupling of the screws with the seal. During normal turbine operation the screws 18 keep the seal 15 retracted away from the shaft's collar 14 and the opening in the compartment 12. The shaft is therefore rotating unimpeded by the seal.

In preparation for transfer to an inclined position and subsequent submergence, the turbine's rotor 2 is stopped, the shaft 11 stops rotating and is locked by applying a brake (not shown). Screws are then activated moving the seal 15 along the shaft outwards until the seal becomes fully engaged with the collar 14 and the flange 12A. The elastic insert 13 tightly plugs the gap between the shaft 11 and the compartment 12—the compartment 12 is sealed so as to withstand submergence in water and to prevent water leakage inside.

When the conditions are proper to resume normal operation, the turbine 9 is brought upright, the seal 15 is retracted by applying an appropriate rotational action of the screws 18, and the brake is removed. The turbine 9 is then ready to start energy production. A computer 91 controls and monitors the sealing and unsealing of the hub 1 as a part of the process for incline and upright turbine 9 movement. Emergency energy storage 90 provides power when turbine 9 is not operational, in particular under water, and energy supply from on-shore facilities is not available.

Although the description above is focused on a sealing of the hub 1, it is applicable to any other compartment housing sensitive equipment to be protected from water, and which is penetrated by a moving element, for example power generating equipment installed in the tower 3.

Onshore/Dry Dock Final Assembly of the Wind Generator

Figure 10:
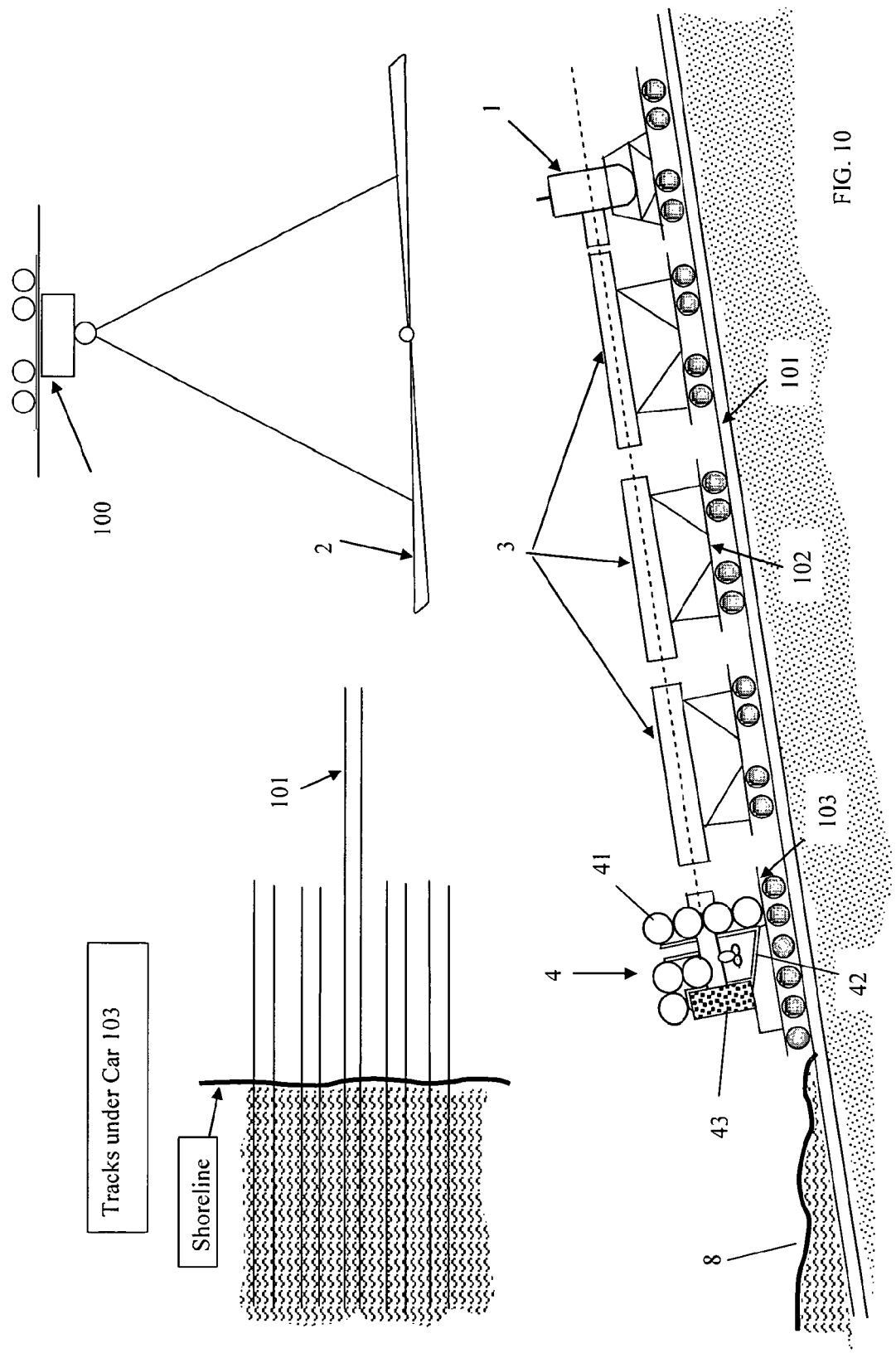
FIG. 10. is a schematic view of dry dock final assembly of the wind turbine.

One of main objects of the present invention is facilitation of manufacturing and maintenance methods of wind generators 9. While separate components of wind generators are produced at facilities employing established modern methods of heavy machinery manufacturing, the final assembly is presenting a formidable challenge because of the assembled wind generator's size that until now precluded its transportation and deployment in one piece. Important features of the current invention make it possible to transport fully assembled wind generator 9 and install it at sea without the need for assembly at the deployment site. These features therefore also enable the final assembly of the wind generator 9 in a manufacturing facility on-shore. FIG. 10 depicts the preferred but not limiting embodiment of a final assembly method.

All components of the wind generator are loaded on flat-bed railroad cars 102 which are arranged on railroad tracks 101 in a sequence they are going to be put together. The cars are of the common type employed by railroad companies and modified with specialized scaffolding and frames for support of particular components. For example, hub 1 requires scaffolding different from the ones supporting tower sections 3. The car underneath the base 4 is different from all because of the great weight to be supported. This car 103 comprises in this embodiment 10 flat-bed carriages arranged in 2 rows of 5 cars side-by-side and ganged together in one platform. It rides on 5 pairs of tracks—see FIG. 10 insert. The middle track pair 101 is the one which carries cars with hub 1 and tower 3 components.

By a way of example, the railroad cars discussed herein are available from ACF Industries LLC of Milton, Pa. and numerous other manufacturers.

The turbine components are aligned and fastened together, as the cars are coupled and locked to form a train. Eventually the rotor 2 is attached to the turbine with a help of an overhead hoist 100. All systems undergo testing. Then the resultant train is pushed on tracks extending into water until the base part 4 of the turbine is on verge of floating. Water ballast is filled into pontoons 41 in base 4 to keep the turbine in inclined position. The train is pushed into water until finally the whole turbine is floating. At this point a tow boat 150 pulls the wind generator away for deployment. The train is pulled from water back on shore ready for another wind generator 9 assembly.

An opposite sequence is employed when bringing a wind generator for maintenance. A train composed of at least 4 carriages 101 and a carriage 103 is pushed on tracks into water. Tow boat 150 brings in the turbine 9 and with the help of on-shore personnel positions it above the submerged train. The train and turbine are connected together, water ballast in turbine is drained, and the train with the turbine on top of it is pulled on shore. As needed, the component that has to be retrofitted or repaired, and the carriage hauling it, are detached from the rest and pulled away, while replacement component is attached instead.

The manufacturing method described above allows for employment of modern manufacturing/management techniques geared toward cost reduction of wind turbine manufacturing and deployment.

Ecological Impact

A wind farm comprising multitude of deep offshore wind generators 9 does not require permanent structures to be built on the sea floor—the mooring ballasts 5 can be easily brought up to the surface and taken away. A direct current underwater cable 7 connecting the generators cluster to the shore bulkhead emits very little and therefore has a minimal impact on marine life. The bulkhead where the cable 7 enters the on-land grid facilities can be built sufficiently inland (the cable will be buried when entering shallow waters and the shoreline) so as not to disturb beach activities and real estate property values. Thus the overall impact on the marine life and surrounding environment will be quite small. Remediation of the wind energy generating site is uncomplicated as well.

The present invention provides for a low cost, innovative approach to harvesting the abundance of available wind energy resources off-shore, particularly in deep waters. Furthermore, it allows for leveraging existing wind-turbine products, and proven electrical transmission technologies to minimize undue risk, and shorten time to market.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A deep offshore floating wind turbine comprising:
   a rotor operable to convert a motion of air into a movement of the rotor;
   a hub housing equipment that transforms the movement of the rotor into a useful form of energy;
   a floating base movable with respect to an underlying solid surface, the hub and the rotor being mounted on the floating base;

a tower fixedly connected to the hub to support the hub on one end and fixedly connected to the floating base on the other end; and a tilting mechanism operable to tilt the wind turbine and to bring it into an upright position.

2. The wind turbine according to claim 1, further comprising a controller operable to control operation of the wind turbine.

3. The wind turbine according to claim 2, wherein the floating base comprises a plurality of pontoons, each pontoon including a filling and draining mechanism operable to selectively fill and drain the each pontoon.

4. The wind turbine according to claim 3, wherein the tilting mechanism tilts and brings the wind turbine into the upright position by filling and draining predetermined pontoons of the plurality of pontoons in accordance with a first set of predetermined commands issued by the controller.

5. The wind turbine according to claim 2, further comprising a rotating mechanism attached to the floating base, the rotating mechanism being operable to change an azimuth orientation of the wind turbine by rotating the wind turbine around an axis of the tower in accordance with a second set of predetermined commands issued by the controller.

6. The wind turbine according to claim 3, wherein the floating base further comprises a rigid frame supporting the plurality of pontoons, the tower being fixedly secured to the rigid frame.

7. The wind turbine according to claim 6, further comprising a ballast accommodated within the rigid frame.

8. The wind turbine according to claim 7, wherein the ballast has a predetermined weight and position.

9. The wind turbine according to claim 1, further comprising at least one anchor positioned on the underlying solid surface and connected to the floating base.

10. The wind turbine according to claim 1, wherein at least the hub and pontoons of the floating base are watertight.

11. The wind turbine according to claim 10, wherein at least one of the hub, the tower and the floating base include a ballast-fillable compartment.

12. The wind turbine according to claim 11, wherein the ballast-fillable compartment includes a filling and draining mechanism operable to selectively fill or drain the ballast-fillable compartment with a ballast.

13. The wind turbine according to claim 12, wherein the ballast is one of a high-density material and water.

14. The wind turbine according to claim 7, wherein the ballast is one of a high-density material and water.

15. The wind turbine according to claim 1, further comprising a sail secured to the tower, the sail being operable to assist in changing an azimuth orientation of the wind turbine.

16. The wind turbine according to claim 9, further comprising a tether tension-adjusting mechanism connecting the floating base to the anchor.

17. A method of operating a deep offshore wind turbine having a hub, a rotor, a tower, a floating base with a plurality of pontoons, and a tilting mechanism, the method comprising the steps of:

positioning the wind turbine at a predetermined deep offshore location such that the floating base is located substantially at a water surface and is movable with respect to an underlying solid surface;

using the tilting mechanism to control a vertical position of the wind turbine by distributing a ballast between at least the pontoons;

using the rotor to convert a motion of air into a movement of the rotor;

using equipment housed in the hub to transform the movement of the rotor into a useful form of energy; and using a tower to support the hub and the rotor, said tower being fixedly connected to the floating base on one end and fixedly connected to the hub on another end.

18. The method according to claim 17, wherein the step of using the tilting mechanism to control the vertical position includes selectively filling and draining predetermined pontoons with a water ballast.

19. The method according to claim 18, wherein the step of using the tilting mechanism to control the vertical position includes selectively filling and draining at least one of compartments formed within the hub, the tower and the floating base.

20. The method according to claim 17, wherein the step of using the tilting mechanism to control the vertical position includes submersing the wind turbine at least partially below the water surface by filling selected pontoons and selected compartments of the hub, the tower and the floating base with the ballast.

21. The method according to claim 17, further comprising a step of anchoring the wind turbine to the underlying solid surface such that the floating base is movable with respect to the underlying solid surface.

22. The method according to claim 17, further comprising a step of conveying the wind turbine to the predetermined deep offshore location.

23. The method according to claim 22, wherein the step of conveying the wind turbine further comprises floating the wind turbine in a reclined position by filling selected pontoons and selected compartments of the hub, the tower and the floating base with the ballast.

24. The method according to claim 23, wherein said floating of the wind turbine includes at least partially submersing the wind turbine below the water surface.

25. The method according to claim 23, wherein the step of conveying the wind turbine further comprises towing the floating wind turbine to the predetermined location.

26. The method according to claim 25, wherein the step of conveying the wind turbine further comprises bringing the wind turbine into an upright position by readjusting the ballast in the pontoons and in the selected compartments of the hub and the tower.

27. The method according to claim 17, further comprising a step of controlling an azimuth orientation of the wind turbine by utilizing a rotational mechanism to rotate the wind turbine around an axis of the tower.

28. A method of deploying a deep offshore wind turbine for converting motion of air into a useful form of energy, the wind turbine having a hub, a rotor, a tower, a floating base with a plurality of pontoons, and a tilting mechanism, the method comprising the steps of:

manufacturing the wind turbine at a dry dock;

conveying the wind turbine to a predetermined deep offshore location by floating the wind turbine in a reclined position by filling at least selected pontoons with a ballast;

positioning the wind turbine at the predetermined deep offshore location; and using the tilting mechanism to bring the wind turbine into an upright position by redistributing the ballast among the pontoons such that the floating base is located substantially at a water surface and the tower is substantially vertically oriented.

29. The method according to claim 28, wherein the step of conveying comprises using a tow boat to tow the wind turbine to the predetermined deep offshore location.

30. The method according to claim 28, wherein the floating of the wind turbine further comprises filling selected compartments of at least one of the hub, the tower and the floating base with the ballast.

31. The method according to claim 30, wherein the step of bringing the wind turbine into the upright position further comprises draining the selected compartments of the at least one of the hub, the tower and the floating base.

32. The method according to claim 28, further comprising controlling the reclined position of the wind turbine by controlling and re-distributing the ballast between at least the pontoons.

33. The method according to claim 28, further comprising a step of anchoring the wind turbine to an underlying solid surface such that the floating base is movable with respect to the underlying solid surface.

34. The method according to claim 28, further comprising a step of controlling an azimuth orientation of the wind turbine using a rotational mechanism to rotate the wind turbine around an axis of the tower.

35. A method of maintaining a deep offshore wind turbine for converting motion of air into a useful form of energy, the wind turbine having a hub, a rotor, a tower, a floating base with a plurality of pontoons, and a tilting mechanism, the method comprising the steps of:
retaining the wind turbine in an upright position at a predetermined offshore location by filling at least selected pontoons with a ballast such that the floating base is located substantially at a water surface and the tower is substantially vertically oriented;
bringing the wind turbine into a reclined position by redistributing the ballast among the pontoons such that the wind turbine is afloat in the reclined position;
conveying the wind turbine to a dry dock by floating the wind turbine in the reclined position; and
performing maintenance of the wind turbine at the dry dock.

36. The method according to claim 35, wherein said floating of the wind turbine includes at least partially submersing the wind turbine below the water surface.

37. The method according to claim 35, wherein the step of conveying the wind turbine further comprises towing the floating wind turbine to the dry dock.

38. The method according to claim 35, further comprising a step of controlling the reclined position of the wind turbine by controlling and re-distributing the ballast between at least the pontoons.

39. The method according to claim 35, wherein the step of bringing the wind turbine into the reclined position further comprises using the tilting mechanism to fill selected compartments of at least one of the hub, the tower and the floating base with the ballast.

40. The method according to claim 35, further comprising a step of controlling an azimuth orientation of the wind turbine using a rotational mechanism to rotate the wind turbine around an axis of the tower.

41. A method of protecting a deep offshore wind turbine from severe weather, the wind turbine being operable for converting motion of air into a useful form of energy, the wind turbine having a hub, a rotor, a tower, a floating base with a plurality of pontoons, and a tilting mechanism; the method comprising the steps of:
positioning the wind turbine at a predetermined deep offshore location such that the floating base is located substantially at a water surface;
retaining the wind turbine in an upright position during favorable weather by filling at least selected pontoons with a ballast such that the tower is substantially vertically oriented;
using the tilting mechanism to bring the wind turbine into a reclined position during unfavorable weather by redistributing the ballast among the pontoons and submersing the wind turbine below the water surface at a predetermined depth; and
using the tilting mechanism to return the wind turbine into the upright position at passing of the unfavorable weather by readjusting the ballast in the pontoons and in selected ballast-tillable compartments of the hub and the tower.

42. The method according to claim 41, further comprising controlling an azimuth orientation of the wind turbine by using a rotational mechanism to rotate the wind turbine around an axis of the tower.

43. The method according to claim 41, wherein the step of retaining the wind turbine in the upright position includes selectively filling and draining predetermined pontoons with the ballast.

44. The method according to claim 41, wherein the step of using the tilting mechanism to bring the wind turbine into the reclined position includes selectively filling at least one of the ballast-fillable compartments of the hub and the tower with the ballast.

45. The method according to claim 41, wherein the step of submersing the wind turbine at a predetermined depth below water surface in the reclined position comprises controlling an amount of the ballast in selected pontoons and selected compartments of the hub and the tower.

46. The method according to claim 41, further comprising a step of anchoring the wind turbine to an underlying solid surface.

47. A method of conveying a deep offshore wind turbine for converting motion of air into a useful form of energy, the wind turbine having a hub, a rotor, a tower, a floating base with a plurality of pontoons, and a tilting mechanism, the method comprising the steps of:
using the tilting mechanism to bring the wind turbine into a reclined position by filling at least selected pontoons with a ballast;
conveying the wind turbine to a predetermined deep offshore location by floating the wind turbine in the reclined position;
positioning the wind turbine at the predetermined deep offshore location; and
using the tilting mechanism to bring the wind turbine into an upright position by redistributing the ballast among the pontoons such that the floating base is located substantially at a water surface and the tower is substantially vertically oriented.

48. The method according to claim 47, wherein the step of using the tilting mechanism to bring the wind turbine into the reclined position comprises filling selected compartments of the hub, the tower and the floating base with the ballast.

49. The method according to claim 47, wherein said floating of the wind turbine includes at least partially submersing the wind turbine below the water surface.

50. The method according to claim 47, wherein the step of conveying the wind turbine further comprises towing the floating wind turbine to the predetermined location.

51. The method according to claim 47, wherein the step of using the tilting mechanism to bring the wind turbine into the upright position further comprises readjusting ballast in ballast-fillable compartments of the hub and the tower.

* * * * *